(12) United States Patent
Spilker et al.

(10) Patent No.: US 11,773,238 B2
(45) Date of Patent: Oct. 3, 2023

(54) ACCELERATOR FOR THE VULCANIZATION OF RUBBERY POLYMERS

(71) Applicant: The Goodyear Tire & Rubber Company, Akron, OH (US)

(72) Inventors: Thomas Franklin Spilker, Broadview Heights, OH (US); Frank J. Feher, Copley, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 315 days.

(21) Appl. No.: 17/179,515

(22) Filed: Feb. 19, 2021

(65) Prior Publication Data

US 2021/0261757 A1    Aug. 26, 2021

Related U.S. Application Data

(60) Provisional application No. 62/979,610, filed on Feb. 21, 2020.

(51) Int. Cl.
   *C08K 13/02* (2006.01)
   *B60C 1/00* (2006.01)

(52) U.S. Cl.
   CPC ............ *C08K 13/02* (2013.01); *B60C 1/0016* (2013.01)

(58) Field of Classification Search
   CPC .................................. C08K 13/02; B60C 1/00
   USPC ....................................................... 523/200
   See application file for complete search history.

(56) References Cited

U.S. PATENT DOCUMENTS

| 4,012,332 A | 3/1977 | Behrens |
| 4,687,756 A | 4/1987 | Okamoto |
| 2004/0006163 A1 * | 1/2004 | Hong ............... C08K 5/40 524/495 |
| 2011/0071253 A1 | 3/2011 | Hochi |
| 2015/0166774 A1 | 6/2015 | Feldhues |

FOREIGN PATENT DOCUMENTS

WO    0194461 A1    12/2001

OTHER PUBLICATIONS

Extended European Search Report for European Patent Application No. 21155630 dated Jul. 20, 2021 which is the European counterpart to the subject patent application.

\* cited by examiner

*Primary Examiner* — Deve V Hall
(74) *Attorney, Agent, or Firm* — Alvin T. Rockhill

(57) ABSTRACT

It has been discovered that certain monofunctional thiuram compounds can be synthesized at low cost and utilized as vulcanization accelerators which provide excellent cure rates without causing a high level of scorch. The use of these monofunctional thiuram compounds as vulcanization accelerators also result in cured rubber compositions that exhibit reduced compression set, improved age hardening characteristics, and degradation resistant crosslinks. These monofunctional thiuram compounds are of the structural formula:

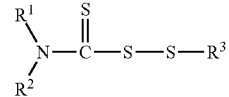

wherein $R^1$ and $R^2$ can be the same or different and represent organyl radicals, wherein $R^1$ and $R^2$ contain a total of at least 8 carbon atoms, and wherein $R^1$ and $R^2$ can join together to form a cyclic structure, and wherein $R^3$ represents an organyl radical containing at least 6 carbon atoms.

20 Claims, No Drawings

ACCELERATOR FOR THE VULCANIZATION OF RUBBERY POLYMERS

This application claims benefit of U.S. Provisional Patent Application Ser. No. 62/979,610, filed on Feb. 21, 2020. The teachings of U.S. Provisional Patent Application Ser. No. 62/979,610 are incorporated herein by reference in their entirety.

BACKGROUND OF THE INVENTION

Accelerators have been used in the vulcanization of natural and synthetic rubber formulations for decades. The primary function of an accelerator in the vulcanization of rubber is to increase the rate of the curing process and frequently to allow for a reduction of the vulcanization temperature. This allows for more efficient utilization of curing molds and can reduce energy requirements. Increased throughput thereby frequently leads to reduced commercial manufacturing costs. However, the accelerator must not lead to premature curing of the rubber formulation before there is sufficient time to mix needed rubber chemicals into the rubber formulation and to form the rubber formulation in a curing mold. In the rubber industry the premature crosslinking of a rubber formylation is referred to scorch and resistance to such premature crosslinking in referred to as scorch safety. In any case, cure characteristics including cure rate, cure time, cure temperature, scorch behavior, and the extent of cure are of extreme importance in the compounding of rubber formulations. The use of vulcanization accelerators also generally leads to improved tensile strength, better resistance to compression set, lower levels of hysteresis, improved aging characteristics, and other beneficial cured rubber properties.

In some cases certain accelerators provide too slow a cure rate when used alone. However, it is frequently possible to speed up the cure rate by adding small amounts of another accelerator. Such a second accelerator is sometimes referred to as an "activator" and its use is called "activation." The accelerators which are most commonly "activated" are the thiazoles, including thiazole sulfenamides. The accelerators most commonly used as "activators" are the thiuram sulfides, dithiocarbamates and guanidines. A ratio of about 1 phr (parts by weight per hundred parts by weight of rubber) of the thiazole to 0.1 phr to about 0.3 phr of the "activator" is typically used and leads to the characterization of the thiazoles as "primary accelerators" and to the activators as "secondary accelerators."

Among the "primary accelerators" benzothiazole sulfenamides are commonly used in the vulcanization of a wide range of diene rubber compositions. They are frequently used in combination with thiuram sulfide and dithiocarbamate "secondary accelerators," which are powerful activators and tend to be fast curing and "scorchy," i.e., they tend to cause premature vulcanization. This is evidenced by the small amounts which are required for activation. A ratio of 10 to 1 of thiazole sulfenamide to activator is common practice.

One of the most widely used accelerator combinations for diene rubbers consists of a benzothiazole sulfenamide and a thiuram sulfide or dithiocarbamate. It is safe, that is not scorchy, provides adequate rate of cure in a reasonable length of time, and results in rubber compositions with good physical properties. Nevertheless, in commercial operations, e.g., in the manufacture of automobile tires, it is always desirable to improve productivity and cost. One means for increasing productivity is to reduce vulcanization time without sacrifice in quality or operating safety. Over the years, various cure systems have been evaluated, some of which significantly increased the rate of cure, but at a cost in reduced processing safety, scorch, which has restricted their use.

Dithioacid salts, such as dithiocarbamates or thiurams, are frequently called "ultra-accelerators" and rapidly accelerate vulcanization at conventional vulcanization temperatures. However, their use frequently leads to the problem of prematurely vulcanizing the rubber compositions during processing steps, such as mixing or molding, due to the heat generated by their own activity resulting in undesired scorching of the rubber. Sulfenamides, so called "delayed action accelerators", do not generally present scorching problems, but they tend to retard the rate of vulcanization. In general, conventional accelerators exhibit scorch characteristics that are directly proportional to their rate of vulcanization. In other words, conventional accelerators that promote faster rates of vulcanization normally lead to a higher level of susceptibility to scorch (premature crosslinking) during vulcanization.

U.S. Pat. No. 4,012,332 discloses a rubber vulcanization accelerator composition comprising (a) from about 0.1 to 1.5 parts of a benzothiazole-2-sulfenamide, (b) from about 0.02 to 1.5 parts of a thiuram sulfide or a metal dithiocarbamate, said metal being selected from the group consisting of zinc, cadmium, tellurium, bismuth, nickel, selenium and lead, and (c) from about 0.002 to 1.5 parts of copper 2-mercaptobenzothiazole per each 100 parts of said rubber; the weight ratio of said components (a), (b) and (c) being in the range from about 10:1:0.05 to 1:1:1, respectively. These accelerator compositions are touted as greatly increased the rate of cure, shortening cure times, providing adequate scorch safety, and attaining cured rubbers having an excellent combination of physical properties.

U.S. Pat. No. 4,687,756 reveals certain vulcanization accelerators containing as an active ingredient a compound having at least one dithiocarbamoyl group, such as thiuram monosulfides, thiuram disulfides, thiuram polysulfides and metal dithiocarbamates all obtained by using, as starting materials, N-substituted piperazine derivatives, for example, N-alkylpiperazines which are substituted on the nitrogen by an alkyl group such as methyl, ethyl, n-propyl, i-propyl, n-butyl, i-butyl, sec-butyl, tert-butyl, pentyl, amyl, hexyl, heptyl, octyl, nonyl, decyl, undecyl, dodecyl or the like; N-cycloalkylpiperazines which are substituted on the nitrogen by a cyclopropyl, cyclopentyl, cyclohexyl, cycloheptyl, cyclooctyl group or the like; and N-substituted piperazines which are substituted on the nitrogen by an aryl or aralkyl group such as phenyl, methylphenyl, ethylphenyl, propylphenyl, naphthyl, methylnaphthyl, benzyl, phenylethyl or the like. Of these compounds thiuram derivatives or metal dithiocarbamates obtained by using N-methylpiperazine as a starting material are reported to be preferred.

Tetraalkylthiuram disulfides, such as tetramethylthiuram disulfide, tetraethylthiuram disulfide, and tetrabutylthiuram disulfide, are thiuram ultra accelerators that are utilized in curing a wide variety of industrial rubber products, including tire, power transmission belts, conveyor belts, hoses, air springs, and a numerous other rubber products. Methyl Tuads® tetramethylthiuram disulfide, Ethyl Tuads® tetraethylthiuram disulfide, and Butyl Tuads® tetrabutylthiuram disulfide are sold by Vanderbilt Chemicals. Tetraalkylthiuram disulfide is also sold by Eastman Chemical. The use of such tetraalkylthiuram disulfides as accelerators leads to fast curing rates. However, the utilization of tetraalkylthiuram disulfides as accelerators frequently leads of a low level of scorch safety which causes manufacturing problems and a product defects.

Bis-(phenylmethyl)-carbamo-(dithioperoxo)-thioic acid-1,6-hexanediylester which can also be called 1,6-bis(N,N-dibenzylthiocarbamoyldithio)hexane and which has been assigned CAS Number 151900-44-6 provides fast rubber cure rates and its use as an accelerator normally provides a good level of scorch safety. Vulcuren® bis-(phenylmethyl)-carbamo-(dithioperoxo)-thioic acid-1,6-hexanediylester is commercially available from Rhein Chemie. However, this accelerator is expensive and its use leads to a significantly higher manufacturing cost.

SUMMARY OF THE INVENTION

The present invention is based upon the discovery that certain monofunctional thiuram compounds can be made at low cost and utilized as vulcanization accelerators which provide excellent cure rates without causing a high level of scorch. The use of these monofunctional thiuram compounds as vulcanization accelerators also result in cured rubber compositions that exhibit reduced compression set, improved age hardening characteristics, and oxidation resistant crosslinks. These monofunctional thiuram compounds are of the structural formula:

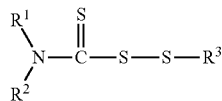

wherein $R^1$ and $R^2$ can be the same or different and represent organyl radicals, wherein $R^1$ and $R^2$ contain a total of at least 8 carbon atoms, and wherein $R^1$ and $R^2$ can join together to form a cyclic structure, and wherein $R^3$ represents an organyl radical containing at least 6 carbon atoms. In these monofunctional thiuram compounds $R^1$ and $R^2$ will preferably contain a total of at least 8 carbon atoms.

The present invention more specifically discloses a productive rubbery composition which is comprised of (A) an unsaturated rubber, (B) reinforcing silica, (C) a silica coupling agent, (D) sulfur, (E) carbon black, and (F) an accelerator of the structural formula:

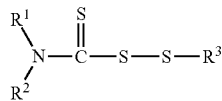

wherein $R^1$ and $R^2$ can be the same or different and represent organyl radicals, wherein $R^1$ and $R^2$ contain a total of at least 2 carbon atoms, and wherein $R^1$ and $R^2$ can join together to form a cyclic structure, and wherein $R^3$ represents an organyl radical containing at least 6 carbon atoms. In these monofunctional thiuram compounds $R^1$ and $R^2$ will preferably contain a total of at least 8 carbon atoms. Such productive rubber compositions will also typically contain a metal activator compound. The metal activator compound will typically be selected from the group consisting of zinc compounds, cadmium compounds, mercury compounds, calcium compounds, and magnesium compounds with zinc compounds normally being preferred.

The subject invention further reveals method for manufacturing a rubber article which comprises shaping a productive rubber composition 1 into a desired geometric form in a mold and curing the rubber composition in the mold at an elevated temperature which is within the range of about 270° F. to 350° F., wherein the productive rubbery composition which is comprised of (A) an unsaturated rubber, (B) reinforcing silica, (C) a silica coupling agent, (D) sulfur, (E) carbon black, and (F) an accelerator of the structural formula:

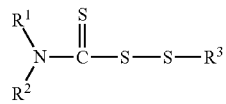

wherein $R^1$ and $R^2$ can be the same or different and represent organyl radicals, wherein $R^1$ and $R^2$ contain a total of at least 2 carbon atoms, and wherein $R^1$ and $R^2$ can join together to form a cyclic structure, and wherein $R^3$ represents an organyl radical containing at least 6 carbon atoms. In such a method $R^1$ and $R^2$ will preferably contain a total of at least 8 carbon atoms.

The present invention also discloses a rubber article, such as a tire, a hose, a power transmission belt, a conveyor belt, an air spring, a windshield wiper blade, a shoe sole, a latex glove, a gasket, or a seal, which is comprised of a cured unsaturated rubber, wherein the cured unsaturated rubber is crosslinked with monosulfide groups, wherein the cured unsaturated rubber has pendent —S—$R^3$ groups, wherein $R^3$ represents an organyl radical containing at least 6 carbon atoms, and wherein the unsaturated rubber is includes a reinforcing silica. The cured rubber in these rubber articles includes a plurality of thermodynamically stable sulfur crosslinks and exhibits improved age resistance, a low level of compression set, and improved age hardening characteristics.

The subject invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, wherein wherein the cured unsaturated rubber is crosslinked with monosulfide groups, wherein the cured unsaturated rubber has pendent —S—$R^3$ groups, wherein $R^3$ represents an organyl radical containing at least 6 carbon atoms, and wherein the unsaturated rubber is includes a reinforcing silica.

DETAILED DESCRIPTION OF THE INVENTION

The accelerators of this invention can be utilized beneficially in the vulcanization of virtually any natural rubber or unsaturated synthetic rubber. Some representative examples of rubbery polymers that can be vulcanized in accordance with this invention include natural rubber, polybutadiene homopolymes, synthetic polyisoprene homopolymers, styrene-butadiene rubbers (SBR), α-methylstyrene-butadiene rubbers, α-methylstyrene-isoprene rubbers, styrene-isoprene-butadiene rubbers (SIBR), styrene-isoprene rubbers (SIR), isoprene-butadiene rubbers (IBR), α-methylstyrene-isoprene-butadiene rubbers and α-methylstyrene-styrene-isoprene-butadiene rubbers, nitrile rubbers, carboxylated nitrile rubbers, and the like. Various blends of these and other unsaturated rubbers can, of course, also be cured utilizing the accelerators of this invention.

The monofunctional thiuram compounds which are utilized in vulcanizing rubber in accordance with this invention are further described and can be synthesized in accordance with the procedure disclosed in U.S. Patent Application Ser. No. 62/955,323, filed on Dec. 30, 2019. The teachings of in U.S. Patent Application Ser. No. 62/955,323, filed on Dec. 30, 2019 are incorporated herein by reference in their entirety. In vulcanizing rubber formulations the monofunctional thiuram compound will typically be utilized at a level which is within the range of about 0.1 phr to 10 phr. The monofunctional thiuram compound will more typically be employed at a level which is within the range of 0.3 phr to 5 phr and will frequently be included at a level which is within the range of 0.5 phr to 3.5 phr.

Reinforcing silica will normally be included in rubber formulations which are cured using the monofunctional thiuram accelerators of this invention to fully realize the total advantages provided by these accelerators. Such rubber formulations will also typically include a silica coupling agent (sulfur containing organosilicon compound) to realize maximum benefits. Some representative examples of suitable sulfur containing organosilicon compounds that can be employed as the silica coupling agent are of the formula:

$$Z-Alk-S_n-Alk-Z \qquad (I)$$

in which Z is selected from the group consisting of

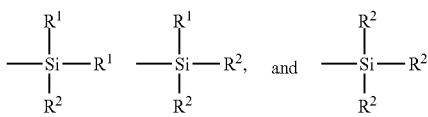

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis (tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxydiethoxysilylethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec-butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec-butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to formula I, preferably Z is

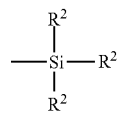

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred. The level of silica coupling agent utilized will normally be within the range of about 0.1 phr to about 20 phr. The amount of silica coupling agent used will more typically be within the range of about 0.5 phr to about 4 phr and will preferably be within the range of 1 phr to 2 phr.

The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 200 phr and will more typically be included at a level which is within the range of 10 phr to 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica. For instance the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Black | |
|---|---|
| ASTM Designation (D-1765-82a) | Surface Area (D-3765) |
| N-110 | 126 $m^2/g$ |
| N-220 | 111 $m^2/g$ |
| N-330 | 83 $m^2/g$ |
| N-339 | 95 $m^2/g$ |
| N-550 | 42 $m^2/g$ |
| N-660 | 35 $m^2/g$ |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402. Vulcanizing agents can, of course, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

Rubber formulations which are cured with the monofunctional thiuram accelerators of this invention can also include, processing oils, waxes, scorch inhibiting agents, antioxidants, and processing aids. In most cases, the rubbery formulation will be compounded with sulfur and/or a sulfur containing compound, at least one filler, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 phr to 150 phr of at least one filler will be utilized in the blend with 30 phr to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The functionalized rubbery polymers of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

Lignin further improves filler/polymer compatibility and reduces the overall weight of the tire tread formulation. The lignin can be a lignosulfonate (also called lignin sulfonate and sulfite lignin) or a kraft lignin (also called sulfate lignin). The lignin will typically be included in the tire tread formulation at an amount which is within the range of 10 phr to 80 phr and will more typically be present at an amount which is within the range of 15 phr to 30 phr. Starch can also beneficially be utilized as a filler in such compositions in addition to the lignin at an amount which is within the range of 10 phr to 50 phr and which is more typically within the range of 15 phr to 30 phr.

Rubber formulations, such as tire tread formulations, which include silica and an organosilicon compound will typically be mixed utilizing a thermomechanical mixing technique. The mixing of the rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art.

The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be conducted for a period of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The monofunctional thiuram accelerators of this invention can be employed in curing rubber blends for used in tire treads in conjunction with ordinary tire manufacturing techniques. For instance, green tires can be vulcanized using a typical tire cure cycle utilizing a wide range of conventional cure temperatures. However, it is generally preferred for the tires of this invention to be cured at a temperature ranging from about 132° C. (270° F.) to about 177° C. (350° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight, polymer microstructures were determined by nuclear magnetic resonance spectrometry (NMR), glass transition temperatures (Tg) were determined by differential scanning calorimetry at a heating rate of 10° C. per minute, and molecular weights were determined by gel permeation chromatography (GPC).

Example 1 and Comparative Examples 2-4

Examples 1-4 evaluate the use of different accelerators at having equimolar loading of $R_2NCS_2$-functionality. Example 1 illustrates the use of N,N-di-benzyl-n-dodecanylbenzylsulfenyldithiocarbamate as an accelerator for use in the vulcanization of rubber in accordance with this invention. Comparative Examples 2-3 were conducted utilizing conventional rubber accelerators which are known in the prior art.

TABLE 1

| Recipe for Examples 1 and Comparative Examples 2-4. | | | | |
| --- | --- | --- | --- | --- |
| Nonproductive Formulation | Loading (phr) | | | |
| Budene ®1207 high cis-1,4-polybutadiene rubber | 100 | | | |
| Carbon Black (N120) | 50 | | | |
| Stearic Acid | 1 | | | |
| Zinc Oxide | 2 | | | |
| N-(1,3 dimethyl butyl)-N'-phenyl-p-phenylene diamine | 2 | | | |
| Napthenic Oil | 10 | | | |
| Microcrystalline Wax | 1 | | | |
| Paraffin Wax | 0.5 | | | |
| Productive Formulation | Ex. 1 | Ex. 2 | Ex. 3 | Ex. 4 |
| Sulfur | 1.50 | 1.50 | 1.50 | 1.50 |
| (N,N-di-benzyl-n-dodecanyl benzylsulfenyl dithiocarbamate) | 1.50 | | | |
| Vulcuren ® (1,6-bis(N,N-dibenzylthiocarbamoyldithio)hexane) | | 1.10 | | |
| Zinc dibenzyldithiocarbamate | | | 0.97 | |
| Tetrabenzylthiuram disulfide | | | | 0.86 |

All of the rubber formulations were prepared utilizing a two-pass procedure wherein non-productive formulation was made followed by the addition of the curatives to make productive formulations as specified in Table 1. Moving die rheometer cures were performed at 160° C. for 60 minutes with the following results:

| | Example 1 | Comparative Example 2 | Comparative Example 3 | Comparative Example 4 |
| --- | --- | --- | --- | --- |
| t25 (minutes) | 4.8 | 4.19 | 2.21 | 2.54 |
| T90 (minutes) | 10.2 | 9.46 | 8.75 | 9.23 |
| Delta Torque (dNm) | 11.39 | 13.16 | 11.16 | 11.25 |

Example 5 and Comparative Examples 6-8

Example 5-8 evaluate the use of different accelerators having equimolar loading of $R_2NCS_2$-functionality in the presence of a second accelerator. Example 5 illustrates the use of N,N-di-benzyl-n-dodecanylbenzylsulfenyldithiocarbamate as an accelerator for use in the vulcanization of rubber in accordance with this invention. Comparative Examples 6-8 were conducted utilizing conventional rubber accelerators which are know in the prior art.

TABLE 2

| Recipes for Example 5 and Comparative Examples 6-8. | | | | |
| --- | --- | --- | --- | --- |
| Nonproductive Formulation | Loading (phr) | | | |
| Budene ® 1207 high cis-1,4-polybutadiene rubber | 100 | | | |
| Carbon Black (N120) | 50 | | | |
| Stearic Acid | 1 | | | |
| Zinc Oxide | 2 | | | |
| N-(1,3 dimethyl butyl)-N'-phenyl-p-phenylene diamine | 2 | | | |
| Napthenic Oil | 10 | | | |
| Microcrystalline Wax | 1 | | | |
| Paraffin Wax | 0.5 | | | |
| Productive Formulation | Ex. 5 | C. Ex. 6 | C. Ex. 7 | C. Ex. 8 |

TABLE 2-continued

Recipes for Example 5 and Comparative Examples 6-8.

| Nonproductive Formulation | Loading (phr) | | | |
|---|---|---|---|---|
| Sulfur | 1.50 | 1.50 | 1.50 | 1.50 |
| N-Cyclohexyl-2-benzothiazolesulfenamide | 1.00 | 1.00 | 1.00 | 1.00 |
| (N,N-di-benzyl-n-dodecanyl benzylsulfenyl dithiocarbamate) | 1.50 | | | |
| Vulcuren ® (1,6-bis(N,N-dibenzylthiocarbamoyldithio)hexane) | | 1.10 | | |
| Zinc dibenzyldithiocarbamate | | | 0.97 | |
| Tetrabenzylthiuram disulfide | | | | 0.86 |

All of the rubber formulations were prepared utilizing a two-pass procedure wherein non-productive formulation was made followed by the addition of the curatives to make productive formulations as specified in Table 2. Moving die rheometer cures were performed at 160° C. for 60 minutes.

| | Example 1 | Comparative Example 2 | Comparative Example 3 | Comparative Example 4 |
|---|---|---|---|---|
| t25 (minutes) | 3.32 | 3.03 | 1.29 | 1.88 |
| T90 (minutes) | 5.05 | 4.56 | 2.15 | 2.96 |
| Delta Torque (dNm) | 17.03 | 18.87 | 18.15 | 17.61 |

While certain representative embodiments and details have been shown for the purpose of illustrating the subject invention, it will be apparent to those skilled in this art that various changes and modifications can be made therein without departing from the scope of the subject invention.

What is claimed is:

1. A productive rubbery composition which is comprised of (A) an unsaturated rubber, (B) reinforcing silica, (C) a silica coupling agent, (D) sulfur, (E) carbon black, and (F) an accelerator of the structural formula:

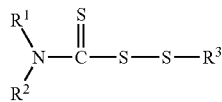

wherein $R^1$ and $R^2$ can be the same or different and represent organyl radicals, wherein $R^1$ and $R^2$ contain a total of at least 2 carbon atoms, and wherein $R^1$ and $R^2$ can join together to form a cyclic structure, and wherein $R^3$ represents an organyl radical containing at least 6 carbon atoms.

2. The productive rubber composition as specified in claim 1 wherein $R^3$ contains from 6 to about 20 carbon atoms, and wherein $R^1$ and $R^2$ contain a total of at least 8 carbon atoms.

3. The productive rubber composition as specified in claim 1 wherein $R^3$ becomes a pendant group on the backbone of the rubber after crosslinking.

4. The productive rubber composition as specified in claim 1 wherein after the productive rubber composition cured $R^3$ is not part of a chemical crosslink.

5. The productive rubber composition as specified in claim 1 wherein $R^3$ represents a t-butyl group or a benzyl group.

6. The productive rubber composition as specified in claim 1 wherein the accelerator is present at a level which is within the range of 0.1 phr to 10 phr.

7. The productive rubber composition as specified in claim 1 wherein said composition is further comprised of a metal activator compound selected from the group consisting of zinc compounds, cadmium compounds, mercury compounds, calcium compounds, and magnesium compounds.

8. The productive rubber composition as specified in claim 1 wherein said productive rubber composition is further comprised of additional fillers selected from the group consisting of nano-cellulose, clay, lignin, and talc.

9. The productive rubber composition as specified in claim 1 wherein the reinforcing silica is present at a level which is within the ranging of 10 phr to 250 phr.

10. The productive rubber composition as specified in claim 1 wherein the reinforcing silica is present at a level which is within the ranging of 20 phr to 80 phr.

11. The productive rubber composition as specified in claim 1 wherein the carbon black is present at a level which is within the ranging of 5 phr to 80 phr.

12. The productive rubber composition as specified in claim 1 wherein the carbon black is present at a level which is within the ranging of 10 phr to 60 phr.

13. The productive rubber composition as specified in claim 1 wherein the total level of silica and carbon black is within the range of 45 phr to about 130 phr.

14. A productive rubbery composition as specified in claim 1 wherein said silica coupling agent is present at a level which is within the range of 1 phr to 20 phr.

15. A method for manufacturing a rubber article which comprises shaping the productive rubber composition of claim 1 into a desired geometric form in a mold and curing the rubber composition in the mold at an elevated temperature which is within the range of about 270° F. to 350° F.

16. A rubber article which is comprised of a cured unsaturated rubber wherein the cured unsaturated rubber is crosslinked with monosulfide groups, wherein the cured unsaturated rubber has pendent —S—$R^3$ groups, wherein $R^3$ represents an organyl radical containing at least 4 carbon atoms, and wherein the unsaturated rubber is includes a reinforcing silica.

17. The rubber article as specified in claim 16 wherein $R^3$ represents an alkyl group containing from 4 to 8 carbon atoms.

18. The rubber article as specified in claim 16 wherein $R^3$ represents a t-butyl group or a benzyl group.

19. The rubber article as specified in claim 16 wherein the rubber article is a tire, wherein said tire which is comprised of a generally toroidal-shaped carcass with an outer circumferential tread, two spaced beads, at least one ply extending from bead to bead and sidewalls extending radially from and connecting said tread to said beads, and wherein said tread is adapted to be ground-contacting.

20. A rubber article as specified in claim 16 wherein the rubber article is selected from the group consisting of latex gloves, gaskets, and seals.

* * * * *